United States Patent
Mukawa et al.

(10) Patent No.: US 8,988,315 B2
(45) Date of Patent: Mar. 24, 2015

(54) HEAD MOUNTED DISPLAY

(75) Inventors: Hiroshi Mukawa, Kanagawa (JP);
Atsushi Kagawa, Saitama (JP); Satoshi Nakano, Kanagawa (JP); Keita Hibi, Tokyo (JP); Yohei Fukuma, Chiba (JP); Tomoaki Takuma, Kanagawa (JP)

(73) Assignee: Sony Corporation, Tokyo (JP)

( * ) Notice: Subject to any disclaimer, the term of this patent is extended or adjusted under 35 U.S.C. 154(b) by 414 days.

(21) Appl. No.: 13/053,697

(22) Filed: Mar. 22, 2011

(65) Prior Publication Data
US 2011/0241975 A1    Oct. 6, 2011

(30) Foreign Application Priority Data

Apr. 6, 2010  (JP) ................................. 2010-087785

(51) Int. Cl.
*G09G 5/00*   (2006.01)
*G02B 5/32*   (2006.01)
*G02B 27/01*  (2006.01)
*G02B 6/00*   (2006.01)

(52) U.S. Cl.
CPC .............. *G02B 5/32* (2013.01); *G02B 27/0172* (2013.01); *G02B 6/00* (2013.01); *G02B 2027/0134* (2013.01)
USPC ................. 345/8; 359/480; 359/633

(58) Field of Classification Search
CPC .................. G09G 2320/0646; G09G 2360/16; G09G 3/3406; G09G 2310/066; G09G 2320/0233; G09G 2320/0247; G09G 2320/041; G09G 2340/16; G09G 2360/145; G09G 3/342; G09G 3/36; G09G 3/3611; G09G 5/10
USPC ....................................... 345/8; 359/480, 633
See application file for complete search history.

(56) References Cited

U.S. PATENT DOCUMENTS

| | | | |
|---|---|---|---|
| 6,447,135 B1 * | 9/2002 | Wortman et al. | 362/623 |
| 2001/0038361 A1 * | 11/2001 | Tanijiri et al. | 345/8 |
| 2007/0070504 A1 | 3/2007 | Akutsu et al. | |
| 2007/0070859 A1 | 3/2007 | Hirayama | |
| 2009/0180194 A1 * | 7/2009 | Yamaguchi et al. | 359/630 |
| 2009/0268287 A1 * | 10/2009 | Buchon et al. | 359/480 |
| 2010/0046070 A1 | 2/2010 | Mukawa | |
| 2011/0248904 A1 | 10/2011 | Miyawaki et al. | |
| 2013/0128611 A1 | 5/2013 | Akutsu et al. | |
| 2013/0135749 A1 | 5/2013 | Akutsu et al. | |

FOREIGN PATENT DOCUMENTS

| | | | |
|---|---|---|---|
| CN | 101655605 A | 2/2010 | |
| JP | 2006-162767 A | 6/2006 | |
| JP | 2006-162798 A | 6/2006 | |
| JP | 2007-094175 A | 4/2007 | |

(Continued)

*Primary Examiner* — Sahlu Okebato
(74) *Attorney, Agent, or Firm* — Wolf, Greenfield & Sacks, P.C.

(57) ABSTRACT

There is provided a head mounted display including a glasses-type frame to be worn on a head of an observer; two optical modules including two image creation devices, and two light guides having two light guide plates coupled one-to-one with the two image creation devices and placed closer to a center of a face of the observer than the image creation devices are as a whole, that guide light beams output from the image creation devices and output the light beams toward pupils of the observer; and an optical plate supporting the two light guides, wherein the optical plate is attached to a center part of the frame.

27 Claims, 14 Drawing Sheets

(56) References Cited

FOREIGN PATENT DOCUMENTS

| JP | 2010-048998 A | 3/2010 |
|---|---|---|
| WO | WO 2007/037089 A1 | 4/2007 |
| WO | WO 2007/039691 A1 | 4/2007 |
| WO | WO 2008/076774 A2 | 6/2008 |

* cited by examiner

FIG. 1
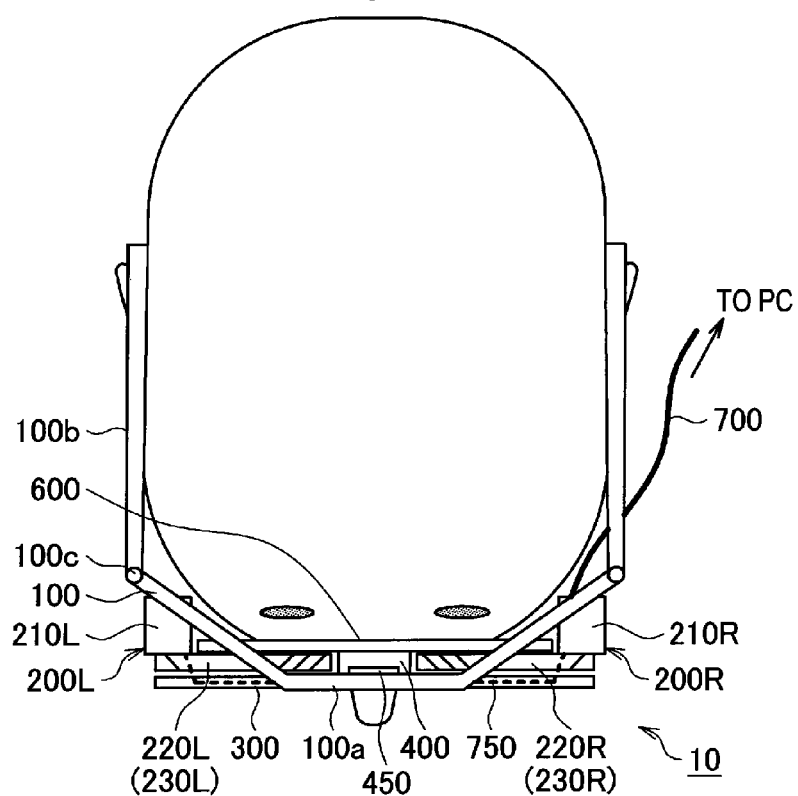
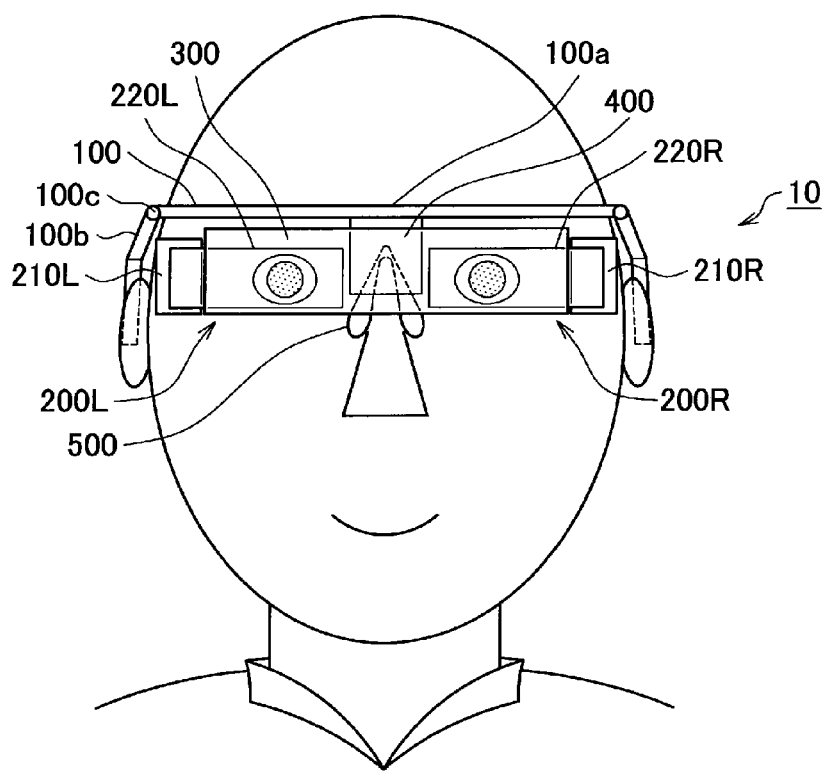

FIG. 5
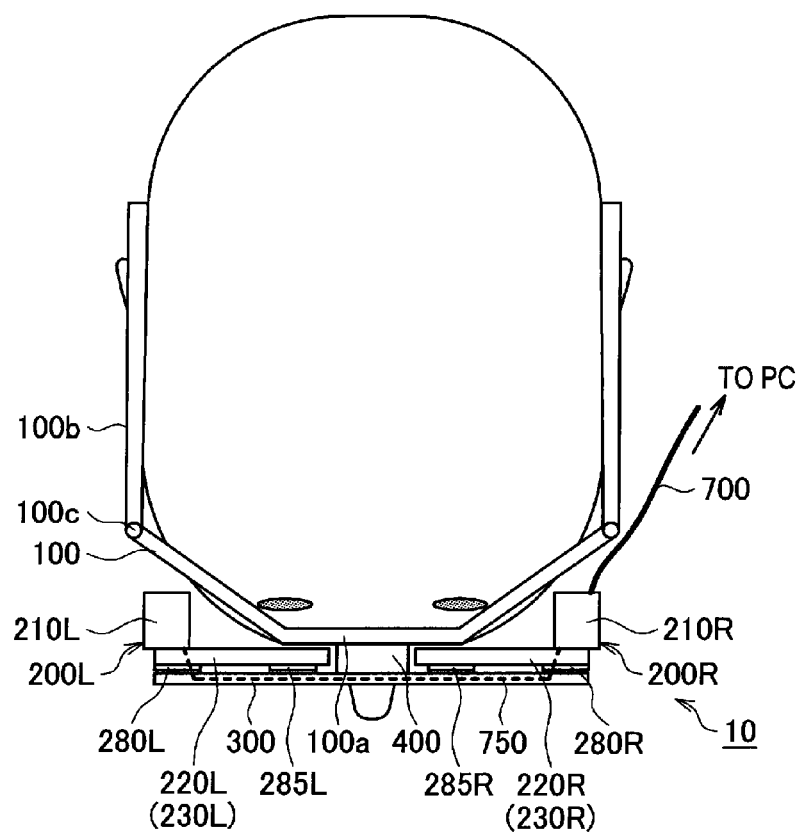
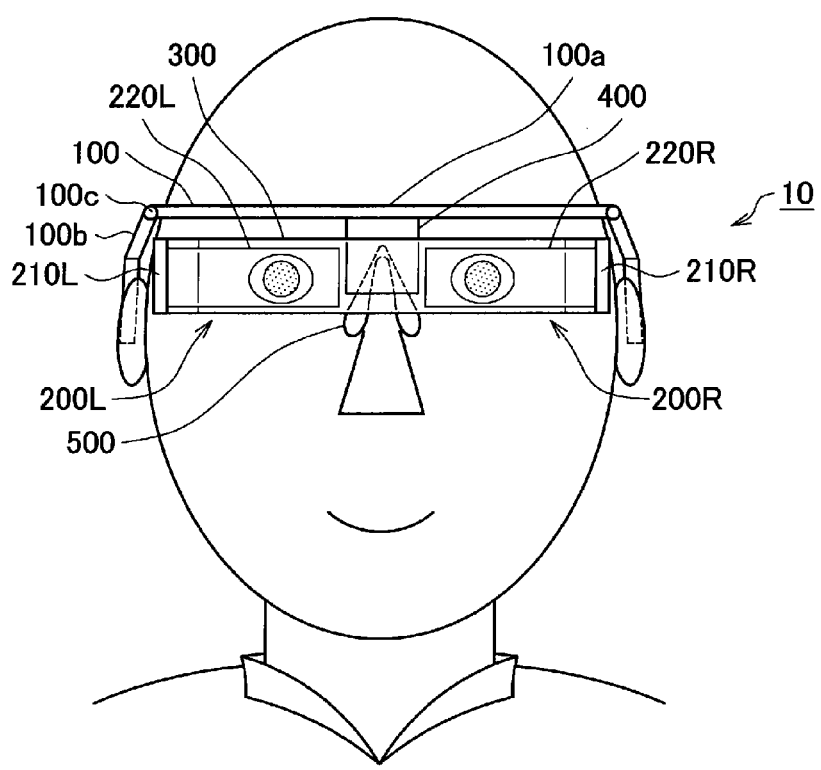

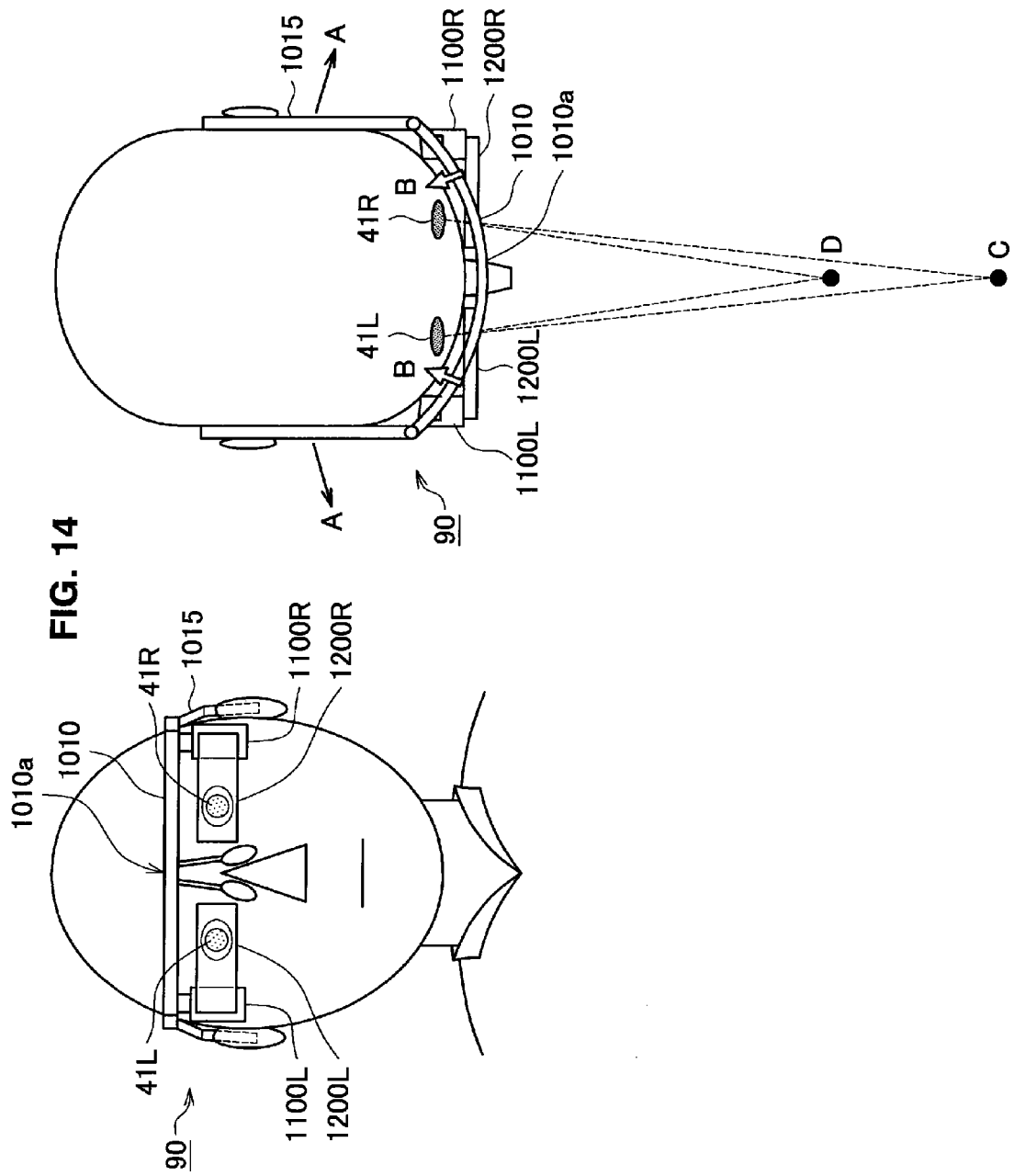

HEAD MOUNTED DISPLAY

BACKGROUND OF THE INVENTION

1. Field of the Invention

The present invention relates to a head mounted display that is worn on the head of an observer and displays images (virtual images).

2. Description of the Related Art

A virtual image display device (image display device) that allows a user to observe a two-dimensional image formed by an image creation device as a magnified virtual image by a virtual image optical system is proposed today (cf. e.g. Japanese Unexamined Patent Application Publication No. 2006-162767).

Further, in order for an observer to observe a two-dimensional image formed by an image creation device as a magnified virtual image by a virtual image optical system, a head mounted image display device using a holographic diffraction grating is also proposed (cf. e.g. Japanese Unexamined Patent Application Publication No. 2007-94175).

FIG. 14 shows a state where an observer is wearing a glasses-type image display device 90. At the left is a front view, and at the right is a plan view. The image display device 90 includes left and right image creation devices 1100L and 1100R that display images, and left and right light guides (optical devices) 1200L and 1200R that receive light displayed on the image creation devices 1100L and 1100R and guide the light to pupils 41L and 41R of the observer. The image display device 90 composed of the image creation devices 1100L and 1100R and the light guides 1200L and 1200R is attached to a glasses-type frame 1010. The observer fits temples 1015 extending from the ends of the frame 1010 to rest on both ears, thereby wearing the image display device 90 on the head of the observer.

SUMMARY OF THE INVENTION

However, when the observer wears the image display device 90, the temples 1015 flex outward in the direction of the arrow A and, accordingly, a front part 1010a of the frame 1010 is deformed in the direction of the arrow B as shown at the right of FIG. 14. When such a phenomenon occurs, a changes occurs in the spatial position of an image (virtual image) created by light beams output from the light guides 1200L and 1200R. Particularly, in the case of a glasses-type head mounted display, the angle of convergence of left and right images varies due to such a phenomenon. As a result, a mismatch occurs in the spatial distance to virtual images adjusted in advance, causing the observer to feel fatigue when observing the images. Specifically, when the spatial position at which the screen centers of left and right virtual images adjusted in advance intersect with each other is a point C as shown at the right of FIG. 14, with the deformation of the front part 1010a of the frame 1010, the spatial position as the point of intersection of the screen centers of left and right virtual images shifts to a point D, resulting in an increase in the angle of convergence.

One approach to overcome the above issue is to enhance the stiffness of the front part 1010a. However, such an approach leads to an increase in the cross-sectional area of the frame 1010 and a necessity for using a material with a high Young's modulus, which can cause an increase in the weight of the frame 1010, deterioration in design, and an increase in costs.

Further, when there are flaws or dirt on a total reflection plane of the light guides 1200L and 1200R, a loss or deviation of orientation appears partially in guiding of display image light beams, and quality degradation occurs such as darkening of an image to be observed or lowering of resolution.

In light of the foregoing, it is desirable to provide a head mounted display which displays images with high quality and design by minimizing the effect of deformation of a frame occurring when worn on the head of an observer on the relative positional relationship between an image obtained by an optical module and the pupils of the observer.

According to an embodiment of the present invention, there is provided a head mounted display which includes a glasses-type frame to be worn on a head of an observer; two optical modules including two image creation devices, and two light guides having two light guide plates coupled one-to-one with the two image creation devices and placed closer to a center of a face of the observer than the image creation devices are as a whole, that guide light beams output from the image creation devices and output the light beams toward pupils of the observer; and an optical plate supporting the two light guides, wherein the optical plate is attached to a center part of the frame.

As described above, if the two image creation devices are supported by the entire frame as shown in FIG. 14, the temples 1015 flex outward in the direction of the arrow A, and the front part 1010a of the frame 1010 is deformed in the direction of the arrow B. Due to the deformation, despite of pre-adjustment of the spatial position at which the screen centers of left and right virtual images intersect with each other to the point C, the actual spatial position is shifted to the point D, resulting in an increase in the angle of convergence and lowering the quality of images.

However, according to the above configuration, the optical plate is attached to the center part of the frame in the state of supporting the two light guide plates coupled to the two image creation devices. The two image creation devices are coupled one-to-one with the two light guide plates which are placed closer to the center of an observer's face than the image creation devices are as a whole. Therefore, the image creation devices are arranged symmetrically outside the face of an observer when worn. The two image creation devices are coupled to the center part of the frame through the optical plate supporting the two light guide plates. Thus, the image creation devices placed at both ends of the two light guide plates are supported only at the center part of the frame.

According to this, the two image creation devices are not supported by the entire frame, thereby, flexure of the frame does not affect the position of the light guide plates. Thus, the light waveguide is thus not deviated. Thereby, it is possible to prevent deviation of the position of image created by image creation devices of the left side and the position of image created by image creation devices of the right side. It is thereby possible to prevent change in the angle of convergence. This allows a user to view high quality images comfortably without providing a feeling of strangeness. According to the above description, it is possible to provide a head mounted display which displays images with high quality and design by minimizing the effect of deformation of a frame occurring when worn on the head of an observer on the relative positional relationship between an image obtained by an optical module and the pupils of the observer.

The optical plate may be fixed to the center part of the frame using a frame attachment member.

A center part of the optical plate may be reinforced by a joint member including a reinforcing member and an adhesive bond.

The optical plate may be placed to cover surfaces of the two light guide plates.

The optical plate may be bonded to the two light guide plates by an adhesive bond containing a spacer.

The optical plate may be a flat transparent glass plate.

The optical plate may be coupled to respective rims of the two light guide plates using a rail.

The two light guides may guide light beams respectively output from the two image creation devices by repeating total reflection respectively in the two light guide plates, and the optical plate may be bonded to total reflection planes of the two light guide plates.

A center part of the frame may be thicker than an outside part.

Holographic optical elements may be respectively placed on an input side and on an output side of each of the two light guide plates in the two light guides.

The two light guide plates may have a mirror internally on an input side and a half minor film on an output side.

According to the embodiments of the present invention described above, it is possible to provide a head mounted display which displays images with high quality and design by minimizing the effect of deformation of a frame occurring when worn on the head of an observer on the relative positional relationship between an image obtained by an optical module and the pupils of the observer.

BRIEF DESCRIPTION OF THE DRAWINGS

FIG. 1 is an overall structural view of a head mounted display according to a first embodiment of the present invention;

FIG. 5 is an overall structural view of a head mounted display according to a second embodiment of the present invention;

FIG. 14 is a view showing an image display device according to related art attached to a glasses frame.

DETAILED DESCRIPTION OF THE EMBODIMENT(S)

Figure 2:
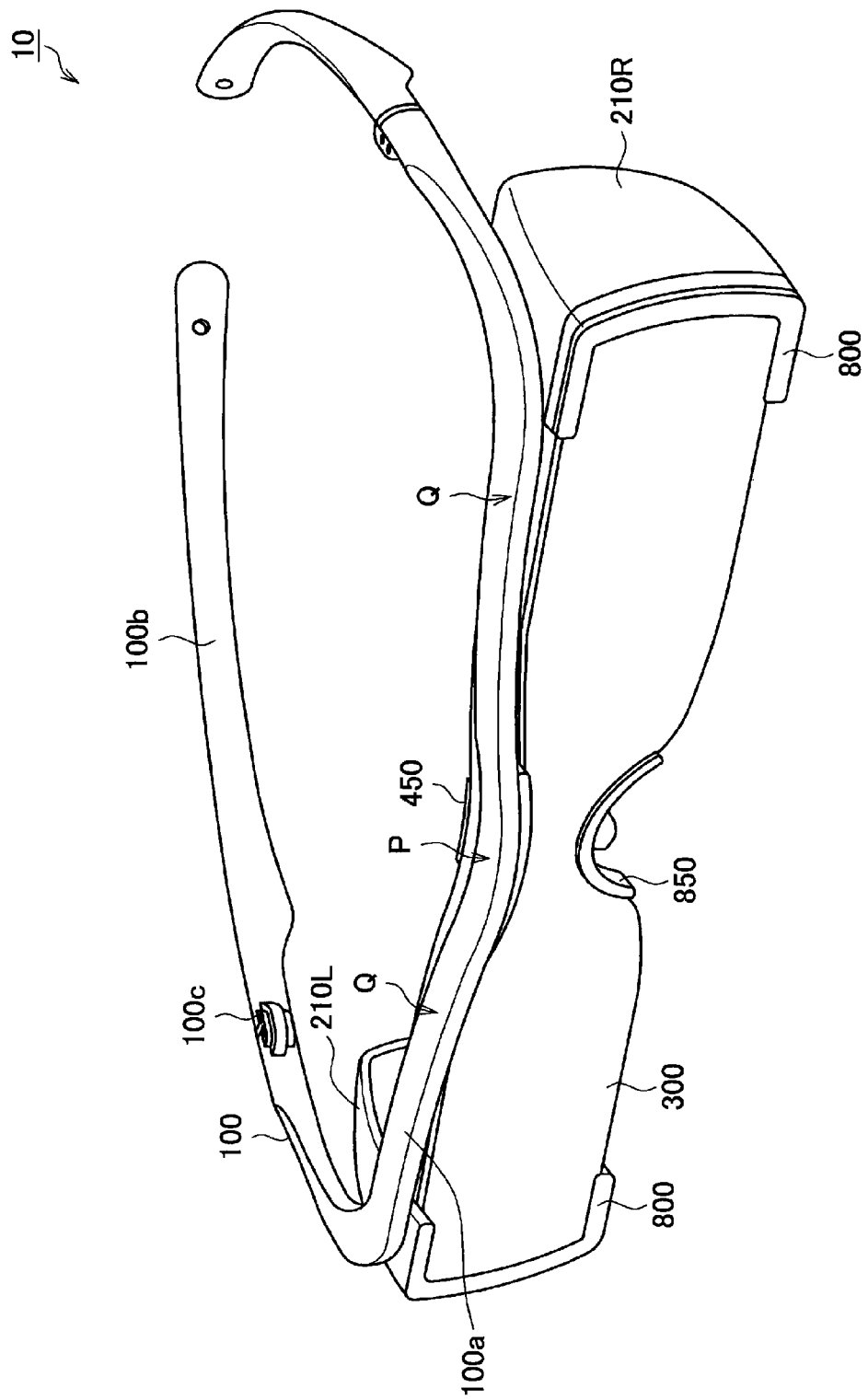
FIG. 2 is a perspective view (front side) of the head mounted display according to the first embodiment.

Hereinafter, preferred embodiments of the present invention will be described in detail with reference to the appended drawings. Note that, in this specification and the appended drawings, structural elements that have substantially the same function and structure are denoted with the same reference numerals, and repeated explanation of these structural elements is omitted.

Embodiments of the present invention will be described in the following order.
<First Embodiment>
[Overall Structure of Head Mounted Display]
[Supporting Method]
[Structure and Operation of Optical Module]
<Second Embodiment>
[Overall Structure of Head Mounted Display]
[Structure and Operation of Optical Module]

First Embodiment

Overall Structure of Head Mounted Display

A head mounted display according to a first embodiment of the present invention is described hereinafter with reference to FIG. 1 as a conceptual illustration. At the bottom of FIG. 1 is a front view, and at the top is a plan view. A head mounted display 10 according to the embodiment includes a frame 100, optical modules 200L and 200R, an optical plate 300, a joint member 400, and a nose pad 500.

The frame 100 is a glasses-type frame to be worn on the head of an observer. The frame 100 is composed of a front part 100a placed at the front of an observer and two temples 100b rotatably attached to both ends of the front part 100a through a hinge 100c. The temples 100b are foldable toward the front part 100a with the hinge 100c as a supporting point.

The frame 100 according to the embodiment substantially has the same structure as normal glasses except that it does not have a rim. The material of the frame 100 is the same as the material of normal glasses, such as metal, alloy, plastic, or a combination or those.

As the temples 100b, a plurality of types such as for child use and for adult use are prepared to be replaceable. For example, the temples 100b for child use have a shape in which the angle is inclined inward with respect to the front part 100a compared to the temples 100b for adult use. This offers a better fit for children. Further, the temples 100b of a plurality of types having different shapes can be replaced with one another in order to alter the vertical angle with respect to the front part 100a. For example, the angle of sight of an observer differs between the first floor and the second floor of a theatre. Therefore, the temples 100b with different vertical angles are attached respectively in the first floor and the second floor. The position of a caption displayed on the head mounted display 10 can be thereby varied between the first floor and the second floor.

The optical modules 200L and 200R create virtual images for the left eye and the right eye and output the virtual images to the respective eyes. The optical module 200L includes an image creation device 210L and a light guide 230L having a light guide plate 220L. The image creation device 210L and the light guide plate 220L are joined by an adhesive or the like, so that the position of the image creation device 210L is fixed relative to the light guide plate 220L.

Likewise, the optical module 200R includes an image creation device 210R and a light guide 230R having a light guide plate 220R. The image creation device 210R and the light guide plate 220R are joined by an adhesive or the like, so that the position of the image creation device 210R is fixed relative to the light guide plate 220R. In this manner, the image creation devices 210L and 210R are coupled one-to-one with the light guide plates 220L and 220R which are placed closer to the center of an observer's face than the image creation devices 210L and 210R are as a whole.

The light guides 230L and 230R input light beams output from the image creation devices 210L and 210R to the light guide plates 220L and 220R, respectively, guide the light beams by repeating total reflection inside the light guide plates 220L and 220R, and then output them toward the pupils of the observer. A specific structure and operation of the optical modules 200L and 200R including the light guides are described later.

The optical plate 300 is a flat transparent glass plate and made of tempered glass. Although the optical plate 300 is a flat plate in this embodiment, it is not necessarily a flat plate as long as the light guide plates 220L and 220R can be attached thereto. The optical plate 300 supports the two light guides 230L and 230R. Specifically, the rear surface of the optical plate 300 and the front surfaces of the light guide plates 220L and 220R are bonded together in the periphery part of the light guide plates 220L and 220R by using an adhesive containing bead spacers with a diameter of about 30 μm, which are not shown. The optical plate 300 thereby supports the two light guide plates 220L and 220R with a small airspace maintained between the optical plate 300 and the light guide plates 220L and 220R. Because the glass surface of the two light guide plates 220L and 220R needs to act as a total internal reflection plane, the glass surface should be the airspace.

The joint member 400 is attached to the center (which corresponds to the bridge of normal glasses) of the front part 100a located between the two pupils of an observer. Specifically, the optical plate 300 is attached to the center of the front part 100a through the joint member 400. The joint member 400 also has a role of reinforcing the center part of the optical plate 300. Specifically, the joint member 400 has a metal plate as a reinforcing member and an adhesive bond, and the metal plate and the center part of the optical plate 300 are bonded together by the adhesive bond.

As described above, the joint member 400 enhances the stiffness of the optical plate 300 and further makes the optical plate 300 attached to the center part of the frame 100 located between the two pupils of an observer. The optical plate 300 may be attached to the frame 100 with a screw, for example. The optical plate 300 is fixed to the center part of the frame 100 using a frame attachment member 450. The joint member 400 and the frame attachment member 450 form an integrated stay.

The nose pad 500 is attached to the center of the front part 100a. To be more specific, the nose pad 500 is attached to the joint member 400.

Not that, in this embodiment, a cover glass 600 that protects the light guide plates 220L and 220R is mounted on the opposite side of the optical plate 300 with the light guide plates 220L and 220R interposed therebetween, which is on the backside of the light guide plates 220L and 220R. However, the cover glass 600 is not an essential element for the head mounted display 10 according to the embodiment, and it may be eliminated.

In one image creation device, a line 700 connected to a PC (Personal Computer), for example, is connected, so that image data is sent to the image creation device 210R from the PC. One image creation device and the other image creation device are connected by flexible wiring 750 running on the top surface of the optical plate 300, so that image data is sent also to the other image creation device from the PC. Note that the PC and the two image creation devices 210L and 210R may perform wireless data communication.

[Supporting Method]

Figure 3:
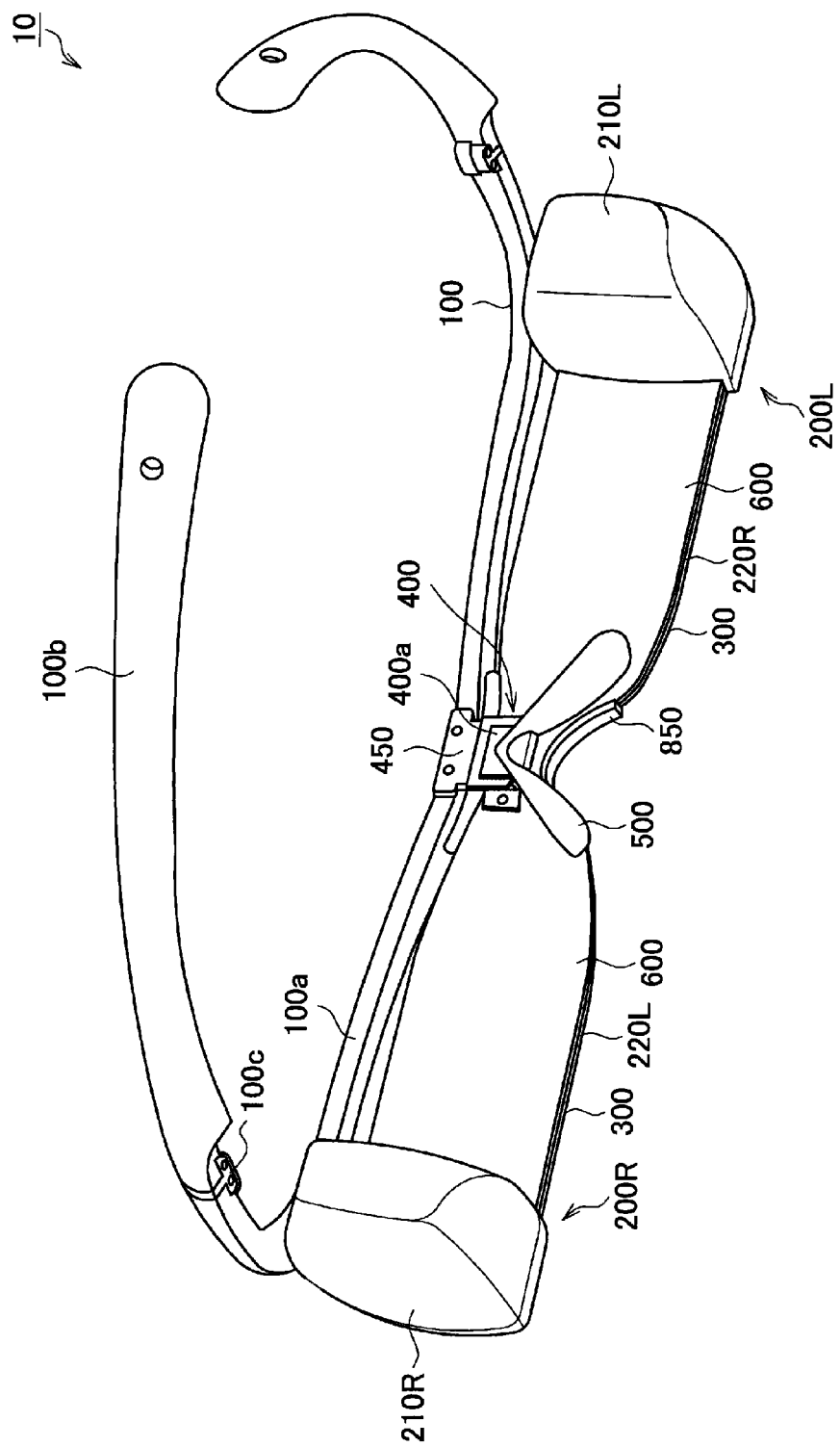
FIG. 3 is a perspective view (rear side) of the head mounted display according to the first embodiment.

The glasses-type head mounted display 10 according to the embodiment has a structure in which the two optical modules 200L and 200R are supported only at the center part of the frame 100 through the optical plate 300. Hereinafter, a supporting method of the head mounted display is described in detail with reference to FIGS. 2 and 3. FIG. 2 is a perspective view of the head mounted display according to the embodiment when viewed from the front side. FIG. 3 is a perspective view of the head mounted display according to the embodiment when viewed from the rear side.

In FIGS. 2 and 3, the optical plate 300, the light guide plates 220L and 220R and the cover glass 600 are integrated together to form a glasses part. Referring to FIG. 2, in the front part 100a of the frame 100, a center part P to which the optical plate 300 is attached is thicker than an outside part Q. When an observer wears the head mounted display 10 on the head, the observer generally wears it by opening the both ends of the frame 100. At this time, stress is applied most heavily to the center of the frame 100. Thus, the center part P of the frame 100 has a large thickness to enhance the breaking strength. However, if the entire frame is thick, the head mounted display 10 increases in weight, which makes it difficult to be worn and less easy to use. Therefore, the outside part Q of the frame 100 has a smaller thickness than the center part P.

Because the head mounted display 10 has a contoured recess corresponding to the position of the nose of an observer, the optical plate 300 is subject to distortion near the contoured recess, which causes a decrease in breaking strength. Therefore, a rail 850 is attached to the contoured recess of the optical plate 300 so as to reinforce the center part of the head mounted display 10.

Further, referring to FIG. 3, the optical plate 300 is coupled to the respective rims of the two light guide plates 220L and 220R bonded to the rear surface of the optical plate 300 using the rail 850, and the cover glass 600. Further, the optical plate 300 is reinforced by a rail 800 at its outer edges at both ends, and coupled to the respective rims of the two light guide plates 220L and 220R and the cover glass 600.

As described above, the joint member 400 reinforces the optical plate 300 at the center of the optical plate 300. Specifically, the joint member 400 has a rectangular metal plate 400a to serve as a reinforcing member and an adhesive bond, and the metal plate 400a and the center part of the optical plate 300 are bonded together by the adhesive bond. The shape of the joint member 400 is arbitrary, and it may have a bar shape, a narrow plate shape or the like, for example. The material of the joint member 400 is preferably a metal such as aluminum, magnesium, stainless steel, titanium or glass-fiber carbon or an alloy of those metals, plastic, or a combination of those materials. The nose pad 500 is attached to the joint member 400. The joint member 400 is joined to the frame attachment member 450 and attached to the front part 100a of the frame 100.

As described above, the head mounted display 10 according to the embodiment has a structure that supports the two optical modules 200L and 200R only at the center part of the frame 100 through the optical plate 300, in addition that it is originally structurally weak at the center part with the presence of the contoured recess for the nose. Therefore, the glass is likely to be deformed at the center of the optical plate 300, and stress is concentrated on the center part. In light of this, the breaking strength is enhanced by use of the joint member 400 with the metal plate 400a attached to the optical plate 300, the rail 850 and so on.

In addition, in order to increase the positioning accuracy of the two optical modules 200L and 200R and clearly display desired images, it is designed to enhance the synthesis, which is elastic modulus (Young's modulus), of the center part. For example, in order to increase the synthesis at the center part of the cover glass 600, it is preferred to change the material of the center part of the cover glass 600 to the one with high synthesis, mix a material with high synthesis only at the center part of the cover glass 600, or form the center part of the cover glass 600 to be thicker than the other part.

[Structure and Operation of Optical Module]

Figure 4:
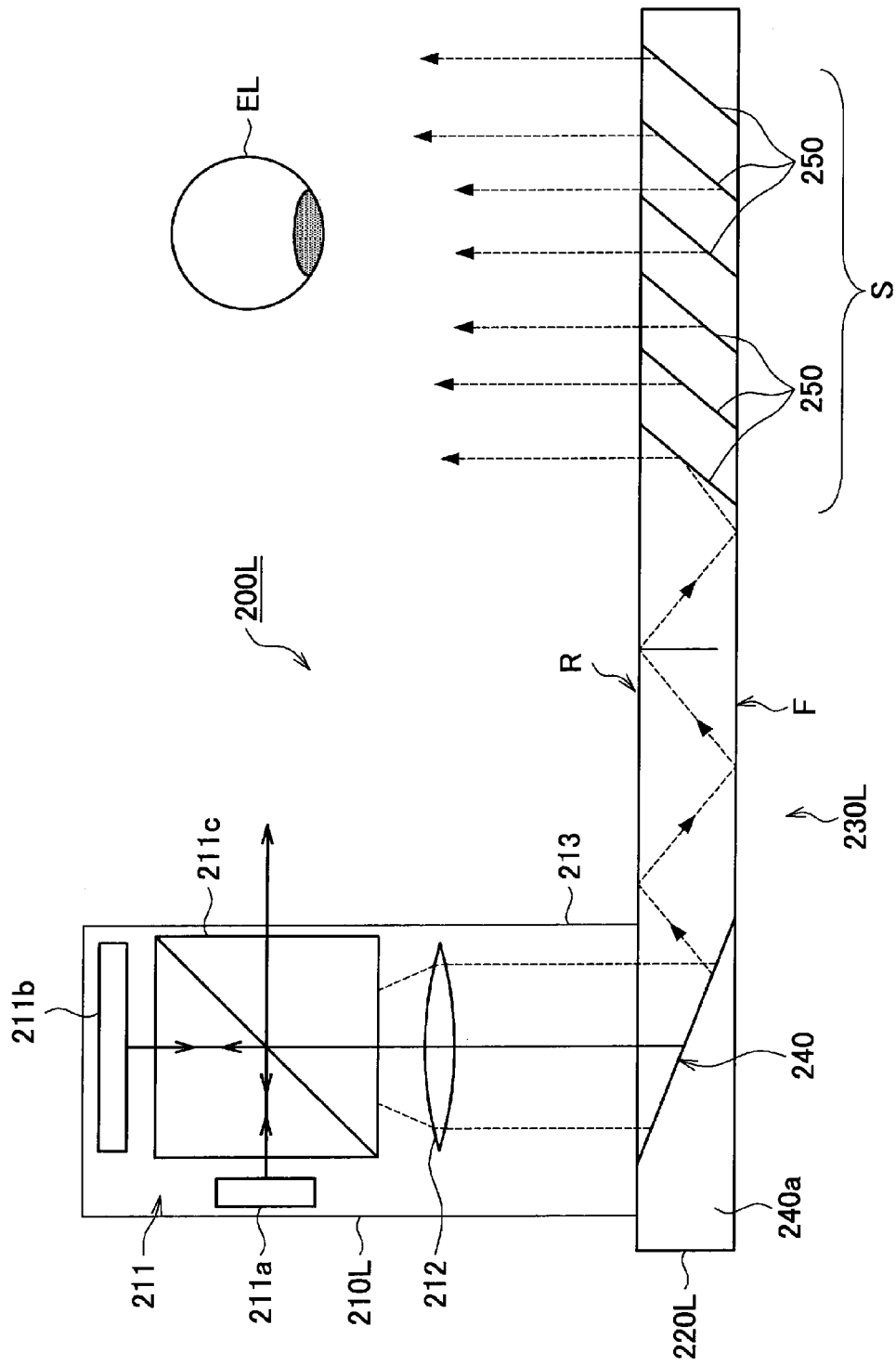
FIG. 4 is a view to explain an image display device and a light guide of the head mounted display according to the first embodiment.

The structure and the operation of the optical modules 200L and 200R according to the embodiment are described hereinafter with reference to FIG. 4. FIG. 4 is a conceptual diagram of the optical module 200L. The optical module 200R is placed symmetrically with the optical module 200L and structurally identical to the optical module 200L, and therefore it is not redundantly described herein.

The optical module 200L includes the image creation device 210L and the light guide 230L. The image creation device 210L includes an image formation unit 211 and a collimator optical system 212. The image formation unit 211 and the collimator optical system 212 are housed in a housing 213 (which is indicated by alternate long and short dashed lines). The housing 213 has an opening, which is not shown, and light is output from the collimator optical system 212 through the opening. The housing 213 is joined to the light guide 230L.

The image formation unit 211 has a plurality of pixels arranged in two-dimensional matrix. The collimator optical system 212 converts light output from the pixels of the image formation unit 211 into parallel light. The parallel light from the collimator optical system 212 is input to the light guide plate 220L, guided therethrough and then output from the light guide plate 220L.

The image formation unit 211 includes a light source 211a, a liquid crystal display device (LCD) 211b, and a polarizing beam splitter 211c. The liquid crystal display device (LCD) 211b and the polarizing beam splitter 211c form a reflection type spatial light modulator. The liquid crystal display device (LCD) 211b is a LCOS (Liquid Crystal on Silicon) as a light valve. The polarizing beam splitter 211c reflects a part of the light emitted from the light source 211a and guides the reflected light to the liquid crystal display device 211b, and transmits a part of the light emitted from the light source 211a and guides the transmitted light to the collimator optical system 212.

The liquid crystal display device 211b has a plurality of pixels arranged in two-dimensional matrix. The polarizing beam splitter 211c has a known structure and configuration. Non-polarized light emitted from the light source 211a encounters the polarizing beam splitter 211c. At this time, p-polarized component of the light passes through the polarizing beam splitter 211c and exits to the outside of the system. On the other hand, s-polarized component of the light is reflected by the polarizing beam splitter 211c, input to the liquid crystal display device 211b, reflected inside the liquid crystal display device 211b, and output from the liquid crystal display device 211b.

Out of the light output from the liquid crystal display device 211b, light output from a pixel for displaying "white" contains much of the p-polarized component, and light output from a pixel for displaying "black" contains much of the s-polarized component. Accordingly, out of the light output from the liquid crystal display device 211b and encountering the polarizing beam splitter 211c, the p-polarized component passes through the polarizing beam splitter 211c and is guided to the collimator optical system 212. On the other hand, the s-polarized component is reflected by the polarizing beam splitter 211c back to the light source 211a.

The liquid crystal display device 211b has 320×240 pixels arranged in two-dimensional matrix (the number of liquid crystal cells is three times the number of pixels), for example. The collimator optical system 212 is a convex lens, for example, and the liquid crystal display device 211b is placed at the position of a focal length in the collimator optical system 212 to create parallel light. Further, one pixel is composed of a red light emitting sub-pixel that emits red, a green light emitting sub-pixel that emits green, and a blue light emitting sub-pixel that emits blue.

The light guide 230L includes the light guide plate 220L, a first polarizer 240, and a second polarizer 250. The input light propagates through the light guide plate 220L by repeating total internal reflection and is then output from the light guide plate 220L.

The first polarizer 240 reflects the light input to the light guide plate 220L so that the light is totally reflected inside the light guide plate 220L.

The first polarizer 240 is made of a metal including aluminum or an alloy, for example, and composed of a light reflection film (a type of mirror) that reflects light input to the light guide plate 220L or a diffraction grating (e.g. holographic diffraction grating film) that diffracts light input to the light guide plate 220L.

The second polarizer 250 transmits and reflects the light having propagated by total reflection through the light guide plate 220L a plurality of times. The second polarizer 250 is composed of a light reflection multilayer film having a multilayer laminated structure, for example, and outputs the light as a plurality of light beams from the light guide plate 220L. In this structure, a mirror is placed internally on the input side, a half-mirror film is placed on the output side, the first polarizer 240 functions as a reflection mirror, and the second polarizer 250 functions as a semitransparent mirror.

The second polarizer 250 may be composed of a multistack structure with multiple dielectric film stacks, a half mirror, a polarizing beam splitter, a holographic diffraction grating film or the like. The dielectric film stack is made of a $TiO_2$ film as a high dielectric constant material and a $SiO_2$ film as a low dielectric constant material. The multi-stack structure with multiple dielectric film stacks is disclosed in Published Japanese Translation No. 2005-521099 of PCT International Publication. Although six-layer dielectric film stacks are illustrated in FIG. 4, it is not limited thereto. A thin piece made of the same material as the material of the light guide plate 220L is interposed between the dielectric film stack and the dielectric film stack.

Note that, in the first polarizer 240, parallel light input to the light guide plate 220L is reflected (or diffracted) in such a way that the parallel light input to the light guide plate 220L is totally reflected inside the light guide plate 220L. On the other hand, in the second polarizer 250, the parallel light having propagated by total reflection through the light guide plate 220L is reflected (or diffracted) a plurality of times and output from the light guide plate 220L in the form of parallel light.

The first polarizer 240 may be formed by carving out a portion 240a for the first polarizer 240 of the light guide plate 220L to make a slope to form the first polarizer 240 in the light guide plate 220L, vacuum-depositing a light reflection film on the slope, and then bonding the carved portion 240a of the light guide plate 220L onto the first polarizer 240. Further, the second polarizer 250 may be formed by producing a multilayer laminated structure composed of multiple lamination of the same material (e.g. glass) as the material of the light guide plate 220L and the dielectric film stack (which may be formed by vacuum deposition, for example), forming a slope by carving out a portion S for the second polarizer 250 of the light guide plate 220L, bonding the multilayer laminated structure onto the slope, and then completing the outer shape by grinding or the like. The light guide 230L in which the first polarizer 240 and the second polarizer 250 are placed inside the light guide plate 220L is thereby formed.

The light guide plate 220L has two parallel planes (a first plane F and a second plane R) which lie in parallel with the axis line (Y direction) of the light guide plate. The first plane F and the second plane R are opposed to each other. When the plane of the light guide plate 220L to which light is input is referred to as a light guide plate input surface, and the plane of the light guide plate 220L from which light is output is referred to as a light guide plate output surface, the light guide plate input surface and the light guide plate output surface may be formed by the first plane F, or the light guide plate input surface and the light guide plate output surface may be formed by the second plane R. In this example, parallel light is input from the first plane F which corresponds to the light input surface, and propagates internally by total reflection, and then output from the second plane R which corresponds to the light output surface.

The material of the light guide plate 220L may be glass including optical glass such as quartz glass or BK7, a plastic material (e.g. PMMA, polycarbonate resin, acrylic resin, amorphous polypropylene resin, styrene resin containing AS resin etc.) or the like. The shape of the light guide plate 220L is not limited to a flat plate, and it may have a curved shape.

In the above structure, the light guides 230L and 230R of the head mounted display 10 guide light beams respectively output from the image creation devices 210L and 210R by repeating total reflection through the light guide plates 220L and 220R. The optical plate 300 is bonded to the total reflection plane of the light guide plates 220L and 220R. Because the light beams propagating through the light guide plates 220L and 220R are guided with total reflection, when there are flaws or dirt on the light guide plates 220L and 220R, the guiding of light stops or a light path is deviated. Therefore, the optical plate 300 is an essential element for protecting the light guide plates 220L and 220R and preventing flaws or dirt from being present on the surfaces of the light guide plates 220L and 220R so as to ensure the total reflection in the light guide plates 220L and 220R. Likewise, the airspace is placed between the optical plate 300 and the light guide plates 220L and 220R is for the purpose of ensuring the total reflection of light by the airspace.

Figure 7:
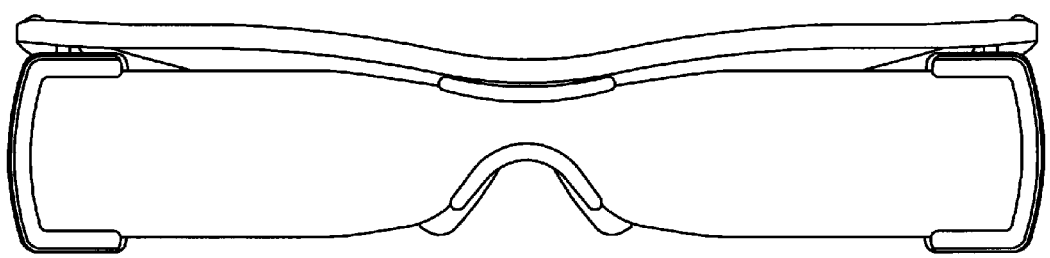
FIG. 7 is a front view of the head mounted display according to the first embodiment.
Figure 8:
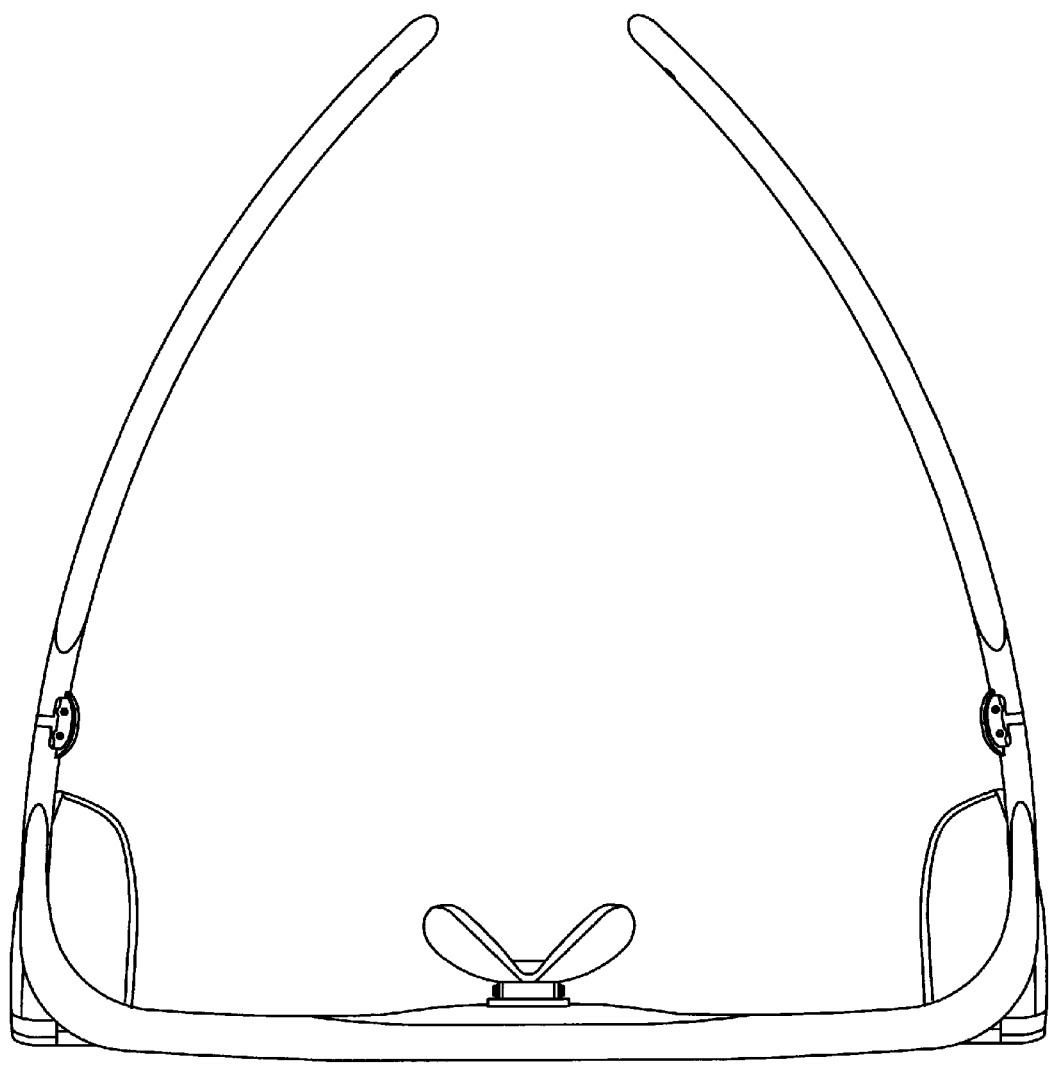
FIG. 8 is a plan view of the head mounted display according to the first embodiment.
Figure 9:
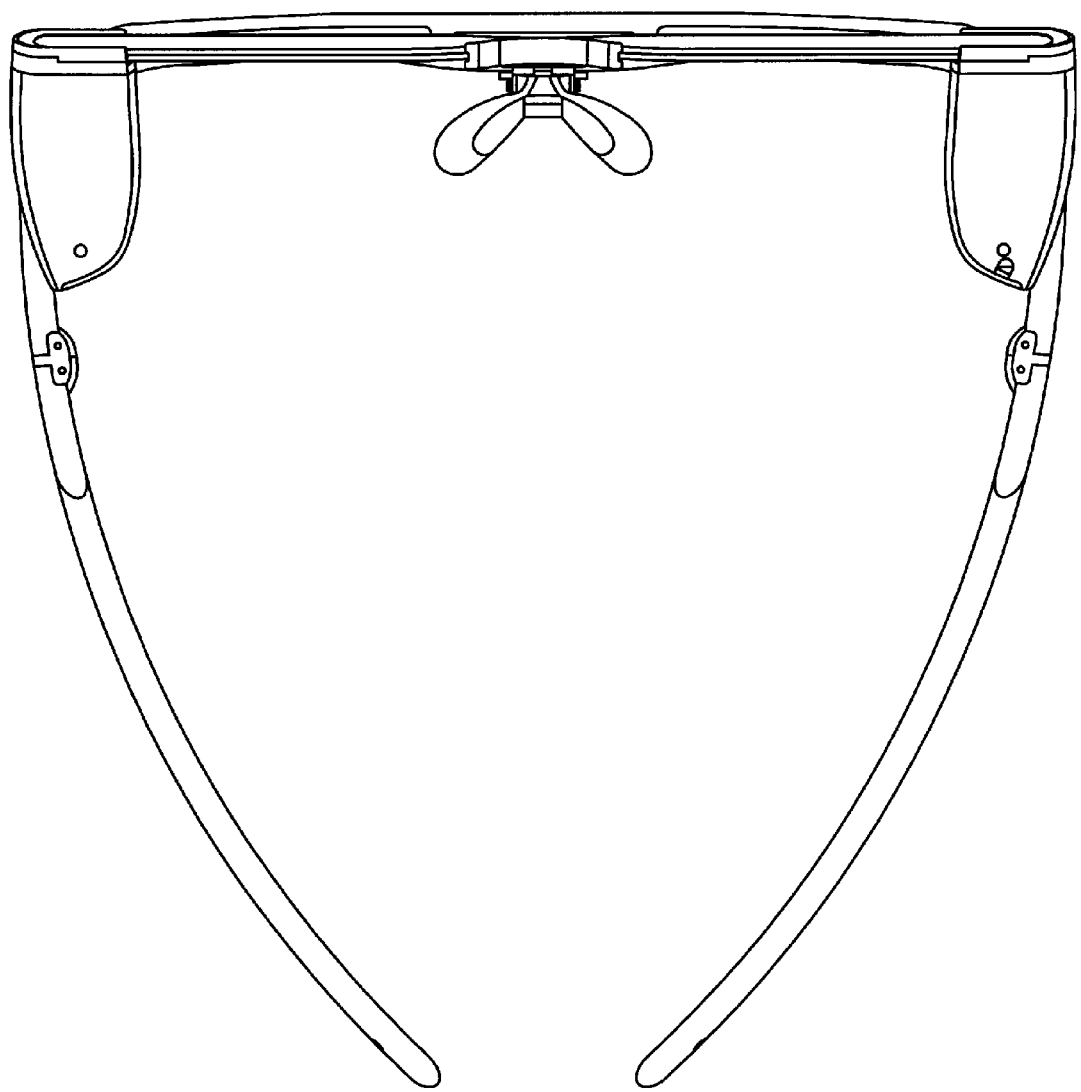
FIG. 9 is a bottom view of the head mounted display according to the first embodiment.
Figure 10:
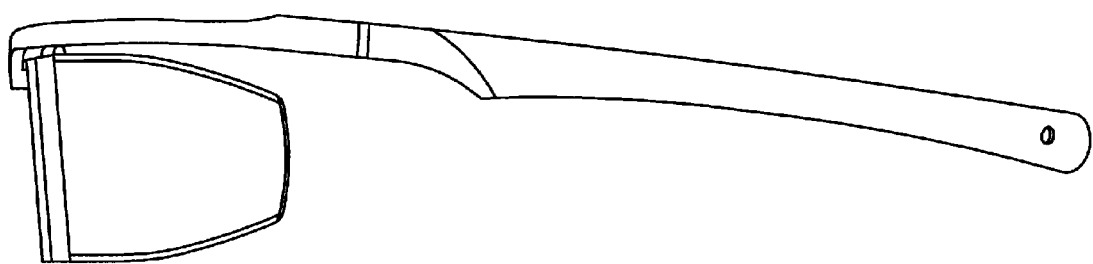
FIG. 10 is a right side view of the head mounted display according to the first embodiment.
Figure 11:
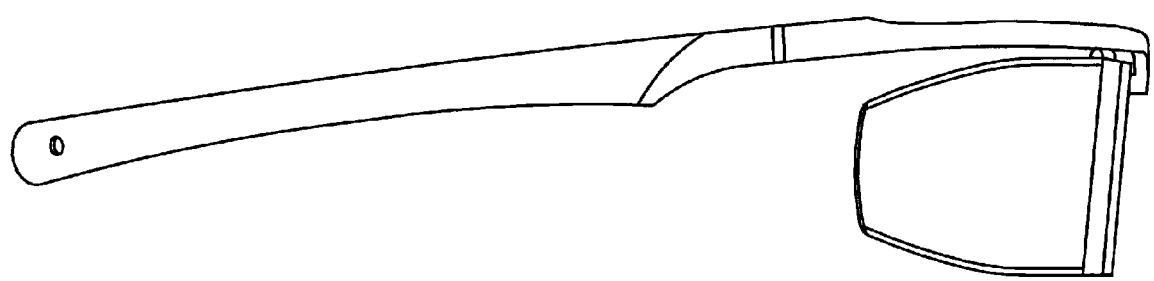
FIG. 11 is a left side view of the head mounted display according to the first embodiment.
Figure 12:
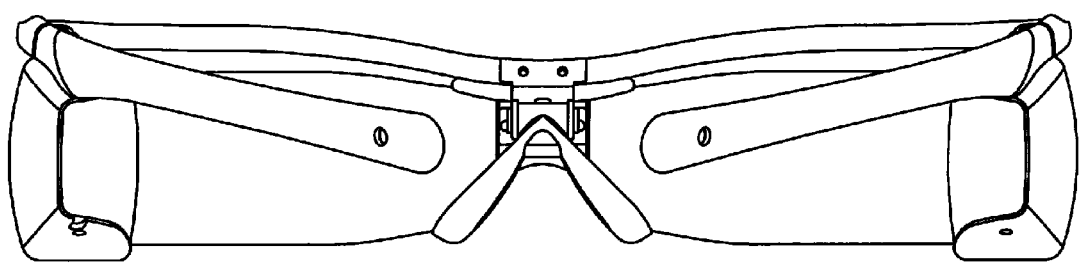
FIG. 12 is a rear view of the head mounted display according to the first embodiment.
Figure 13:
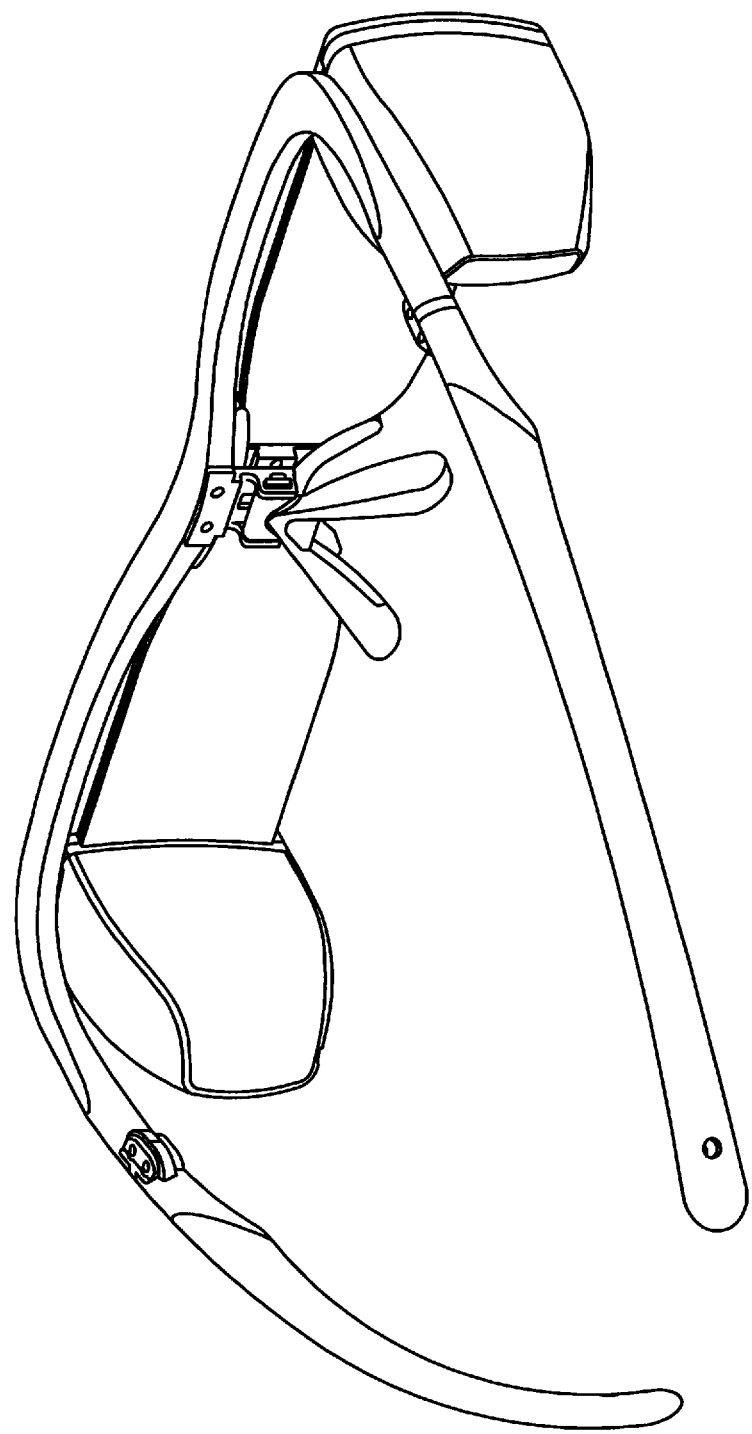
FIG. 13 is a perspective view of the head mounted display according to the first embodiment.

FIGS. 7 to 13 are illustrations of a more specific shape of the head mounted display 10 according to the embodiment. FIG. 7 is a front view of the head mounted display 10, FIG. 8 is a plan view, FIG. 9 is a bottom view, FIG. 10 is a right side view, FIG. 11 is a left side view, FIG. 12 is a rear view, and FIG. 13 is a perspective view. The head mounted display 10 shown in FIGS. 7 to 13 may be also regarded as creation of design. As the article to which the design is applied, it corresponds to "data display device" as classification of article equal to the classification of article in Appendix I, Regulations under the Design law.

As the explanation of the article to which the design is applied, the following explanation may be provided. Specifically, the article to which the design is applied is a head mounted display which includes a glasses-type frame to be worn on the head of an observer, an optical module, and an optical plate.

Further, the article to which the design is applied may have an adjustable nose pad which is vertically slidable. This enables compatibility with both those wearing and not wearing glasses. Specifically, by adjusting the nose pad up or down, the article does not only allows an observer who is not wearing glasses to wear the head mounted display 10 but also allows an observer who is wearing glasses to wear the head mounted display 10 on top of the glasses.

The head mounted display 10 according to the embodiment is descried above. If the two optical modules 200L and 200R are supported by the entire frame as shown in FIG. 14, the temples 1015 flex outward in the direction of the arrow A, and the front part 1010a of the frame 1010 is deformed in the direction of the arrow B. Due to the deformation, despite of pre-adjustment of the spatial position at which the screen centers of left and right virtual images intersect with each other to the point C, the actual spatial position is shifted to the point D, resulting in an increase in the angle of convergence.

However, in the head mounted display 10 according to the embodiment, the optical plate 300 is attached to the center part of the frame 100 in the state of supporting the two light guide plates 220L and 220R coupled to the two image creation devices 210L and 210R. The two image creation devices 210L and 210R are coupled one-to-one with the two light guide plates 220L and 220R which are placed closer to the center of an observer's face than the image creation devices 210L and 210R are as a whole. Therefore, the image creation devices 210L and 210R are arranged symmetrically outside the face of an observer when worn. The two image creation devices 210L and 210R are coupled to the center part P of the frame 100 through the optical plate 300 supporting the two light guide plates 220L and 220R. Thus, the image creation devices 210L and 210R placed at both ends of the two light guide plates 220L and 220R are supported only at the center part P of the frame 100.

In this structure, the optical modules 200L and 200R are supported at the center part so as to minimize flexure of the frame 100 and, even when flexure occurs, to prevent a difference in flexure between left and right from causing a significant effect. Accordingly, the flexure of the frame 100 when worn by an observer does not affect the position of the light guide plates 220L and 220R. The light waveguide is thus not deviated. Thus, even when the temples 100b flex outward and consequently the frame is deformed when an observer wears the frame 100 on the head, the deformation of the frame does not cause displacement (change in position) of the light guides 230L and 230R, or causes only slight displacement if any. It is thereby possible to reliably prevent a change in the angle of convergence of left and right images. This allows a user to view images comfortably. Further, because there is no need to enhance the stiffness of the front part 100a of the frame 100, it is possible to suppress the frame weight from increasing without an increase in costs and thereby provide the head mounted display 10 with high level of design.

Second Embodiment

Overall Structure of Head Mounted Display

An overall structure of a head mounted display according to a second embodiment of the present invention is described hereinafter. The second embodiment is an alternative example of the first embodiment. Referring to FIG. 5, the head mounted display 10 according to the second embodiment has a structure in which first polarizers 280L and 280R and second polarizers 285L and 285R are mounted on the surfaces of the light guide plates 220L and 220R, which is different from the structure of the head mounted display 10 according to the first embodiment in which the first polarizer 240 and the second polarizer 250 are formed in carved portions of the light guide plates 220L and 220R. The head mounted display 10 according to the second embodiment is described hereinafter mainly about such a difference.

As shown in the plan view of the head mounted display 10 at the top of FIG. 5, on the surfaces of the light guide plates 220L and 220R on the optical plate side, film-like holographic optical elements are attached as the first polarizers 280L and 280R and the second polarizers 285L and 285R, respectively on the input side and the output side of each light guide plate.

In this embodiment, the cover glass 600 is not provided on the rear surfaces of the light guide plates 220L and 220R. The head mounted display 10 according to the second embodiment may be provided with or not provided with the cover glass 600. On the other hand, the optical plate 300, particularly, is an essential element in the second embodiment. This is because, in this embodiment, the holograms (films) attached on the surfaces of the light guide plates 220L and 220R are very weak, and it is therefore necessary to protect them with the optical plate 300.

The first polarizers 280L and 280R diffract the light input to the light guide plates 220L and 220R, and the second polarizers 285L and 285R diffract the light having propagated by total reflection through the light guide plates 220L and 220R a plurality of times. The first polarizers 280L and 280R and the second polarizers 285L and 285R are diffraction grating elements, or reflection type diffraction grating elements to be specific, or reflection type volume holographic diffraction gratings to be more specific. In the following description, the first polarizers 280L and 280R being the reflection type volume holographic diffraction gratings are referred to as first diffraction grating members 280l and 280r, and the second polarizers 285L and 285R being the reflection type volume holographic diffraction gratings are referred to as second diffraction grating members 285l and 285r, respectively, for the sake of convenience.

In this embodiment, in order that the first diffraction grating members 280l and 280r and the second diffraction grating members 285l and 285r correspond to diffraction/reflection of P types of light having P different types (specifically, P=3; three types including red, green and blue) of wavelength bands (or wavelengths), P number of diffraction grating layers made of reflection type volume holographic diffraction gratings are laminated.

The material of the first diffraction grating members and the second diffraction grating members may be photopolymer. The construction material and the basic structure of the first diffraction grating members and the second diffraction grating members which are reflection type volume holographic diffraction gratings are the same as the construction material and the structure of the existing reflection type volume holographic diffraction grating. The reflection type volume holographic diffraction grating means a holographic diffraction grating which diffracts or reflects only the +1st order diffracted light beam. The diffraction grating members have an interference pattern from the inside to the surface, and a method of forming the interference pattern may be the same as the existing formation method. Specifically, the interference pattern may be formed by applying object light to a member (e.g. phoropolymer material) constituting the diffraction grating member from a first given direction on one side and, simultaneously applying reference light to the member constituting the diffraction grating member from a second given direction on the other side, and then recording an interference pattern formed by the object light and the reference light inside the member constituting the diffraction grating member. By appropriately selecting the first given direction, the second given direction, and wavelengths of the object light and the reference light, a desired pitch of the interference pattern on the surface of the diffraction grating member and a desired slant angle of the interference pattern can be obtained. The slant angle of the interference pattern means an angle between the surface of the diffraction grating member (or diffraction grating layer) and interference light.

In the case of forming the first diffraction grating members and the second diffraction grating members using a laminated structure of P number of diffraction grating layers made of the reflection type volume holographic diffraction grating, the lamination of diffraction grating layers may be formed by creating P number of diffraction grating layers separately and then laminating (bonding) the P number of diffraction grating layers using UV curable adhesive, for example. Further, the P number of diffraction grating layers may be created by creating a single diffraction grating layer using an adhesive photopolymer material and then creating diffraction grating layers by attaching an adhesive photopolymer material thereon one by one.

Each of the first diffraction grating members 280l and 280r and the second diffraction grating members 285l and 285r may have a structure in which a diffraction grating layer that diffracts or reflects red light, a diffraction grating layer that diffracts or reflects green light, and a diffraction grating layer that diffracts or reflects blue light are laminated.

[Structure and Operation of Optical Module]

Figure 6:
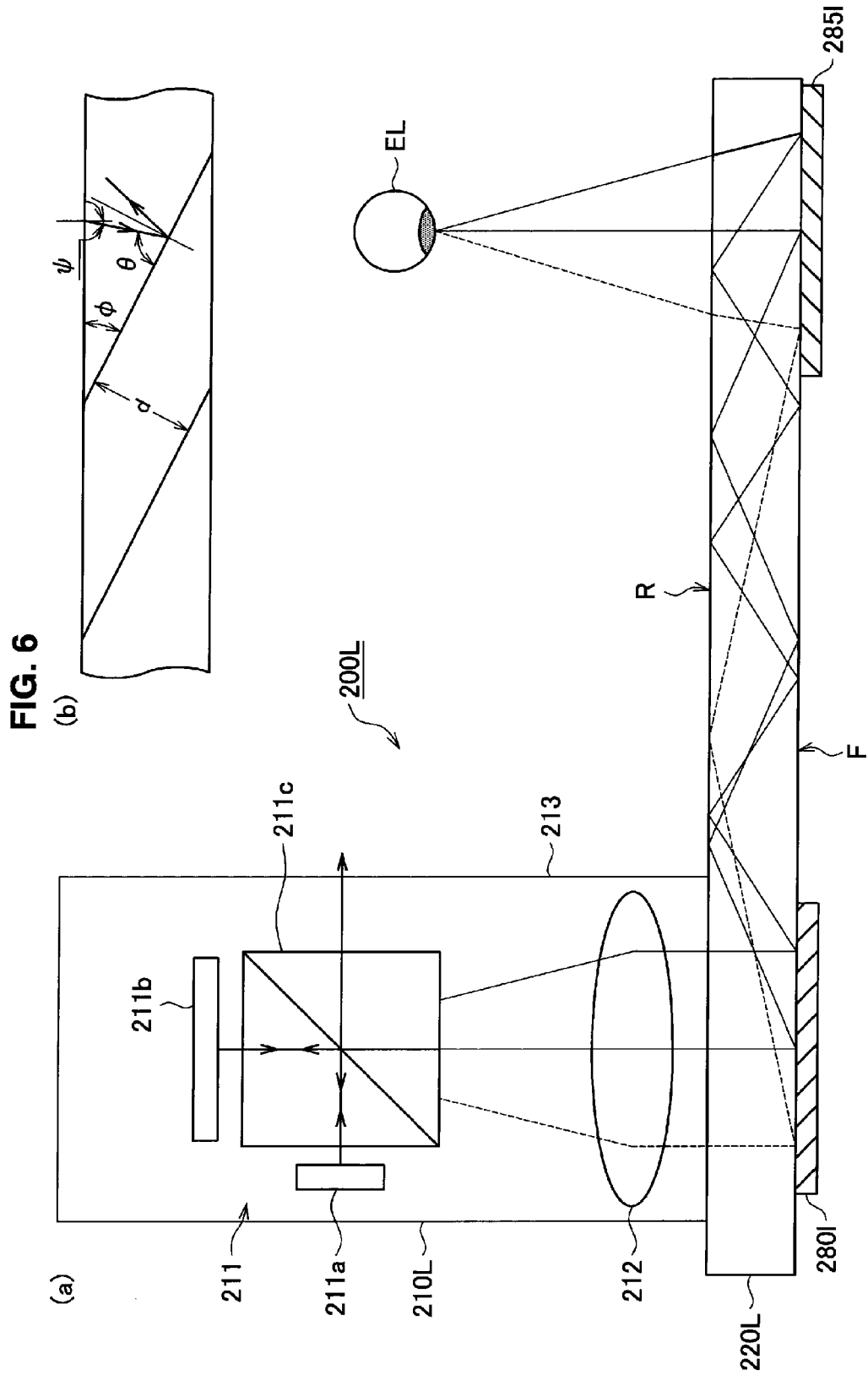
FIG. 6 is a view to explain an image display device and a light guide of the head mounted display according to the second embodiment.

The structure and operation of the optical module 200L, 200R according to the embodiment are described hereinafter with reference to FIG. 6. FIG. 6 is a conceptual diagram of the optical module 200L. In this embodiment also, the optical module 200R is placed symmetrically with the optical module 200L and structurally identical in structure to the optical module 200L, and therefore redundant explanation is omitted, and the structure and operation of only the optical module 200L are described.

In FIG. 6, each of the first diffraction grating member 280l and the second diffraction grating member 285l is illustrated as a single layer. The interference pattern corresponding to one type of wavelength band is formed in each diffraction grating layer. Further, in order to correspond to diffraction/reflection of P types of light beams having P different types of wavelength bands, P types of interference patterns may be formed on the first diffraction grating member and the second diffraction grating member made of a single diffraction grating layer. Further, the angle of view may be divided equally among three, for example, so that the first diffraction grating member and the second diffraction grating member have a laminated structure of diffraction grating layers corresponding to the respective divided angles of view. Such a structure enables an increase in diffraction efficiency, an increase in diffraction angle range, and optimization of the angle of diffraction when the light beam having each wavelength band (or wavelength) is diffracted or reflected by the first diffraction grating member 280l and the second diffraction grating member 285l.

FIG. 6 further shows a schematic enlarged partial cross-sectional view of the reflection type volume holographic diffraction grating at its upper right (b). An interference pattern having a slant angle φ is formed in the reflection type volume holographic diffraction grating. The slant angle φ is an angle between the surface of the reflection type volume holographic diffraction grating and the interference pattern. The interference pattern is formed from the inside to the surface of the reflection type volume holographic diffraction grating. The interference pattern satisfies the Bragg condition. The Bragg condition is a condition that satisfies the following equation (1).

$$m \cdot \lambda = 2 \cdot d \cdot \sin(\Theta) \qquad \text{Equation (1)}$$

In the equation (1), m is a positive integer, $\lambda$ is a wavelength, d is a pitch of a lattice plane (interval of a virtual plane including an interference pattern in the direction of the normal), and $\Theta$ is a supplementary angle of the angle incident on the interference pattern. Further, the relationship of the supplementary angle $\Theta$, the slant angle $\phi$, and the incidence angle $\psi$ when light enters the diffraction grating member at the incidence angle $\psi$ is as represented by the following equation (2).

$$\Theta = 90° - (\phi + \psi) \qquad \text{Equation (2)}$$

The first diffraction grating member 2801 is a film as described above, which is attached to the second plane R of the light guide plate 220L. The second diffraction grating member 2851 is also a film, which is attached to the first plane F of the light guide plate 220L. Parallel light input to the light guide plate 220L from the second plane R propagates by total reflection through the light guide plate 220L, is diffracted or reflected a plurality of times, and then output as parallel light from the second plane R of the light guide plate 220L.

In the light guide plate 220L also, three colors, red, green and blue, of parallel light propagate by total reflection therethrough and are then output. Because the light guide plate 220L is thin and an optical path running inside the light guide plate 220L is long, the number of times of total reflection until reaching the second diffraction grating member 2851 differs depending on the angle of view. Specifically, the number of times of reflection of the parallel light which is input to the light guide plate 220L at an angle in the direction getting closer to the second diffraction grating member 2851 is smaller than the number of times of reflection of the parallel light which is input to the light guide plate 220L at an angle in the direction getting away from the second diffraction grating member 2851. This is because the angle of light propagating through the light guide plate 220L with respect to the normal to the light guide plate 220L upon encountering the inner surface of the light guide plate 220L is smaller for the parallel light which is diffracted or reflected on the first diffraction grating member 2801 and input to the light guide plate 220L at an angle in the direction getting closer to the second diffraction grating member 2851 than for the parallel light input to the light guide plate 220L at an angle in the opposite direction. Further, the shape of the interference pattern formed inside the second diffraction grating member 2851 and the shape of the interference pattern formed inside the first diffraction grating member 2801 are symmetrical with respect to a virtual plane perpendicular to the axis line of the light guide plate 220L.

The head mounted display 10 according to this embodiment also has the optical plate 300 which joins the two light guide plates 220L and 220R. The joint member 400 made of aluminum is attached to the center of the optical plate 300. The joint member 400 is placed for the purpose of enhancing the stiffness of the optical plate 300. The optical plate 300 and the optical modules 200L and 200R may be attached to the center part of the frame 100 located between two pupils of an observer by the joint member 400 and a frame attachment member, which is not shown. The optical plate 300 is attached to the frame 100 using a screw or an adhesive, for example.

The image creation devices 210L and 210R of the optical modules 200L and 200R are respectively located outside the pupils of an observer. The two light guide plates 220L and 220R and the optical plate 300 are bonded together in the peripheral part of the light guide plates 220L and 220R with bead spacers with a diameter of about 30 μm, which are not shown, interposed therebetween. This is because the glass surface of the two light guide plates 220L and 220R needs to act as a total internal reflection plane, and the glass surface should be the airspace. It is thereby possible to protect the input side hologram (first diffraction grating member 2801 and 280r) and the output side hologram (second diffraction grating member 2851 and 285r) attached on the surfaces of the light guide plates 220L and 220R.

The frame 100 is composed of the front part 100a to be placed at the front of an observer and the two temples 100b rotatably attached to both ends of the front part 100a through a hinge 100c. The optical plate 300 is attached to the center of the front part 100a located between two pupils of an observer by the joint member 400 made of aluminum. The nose pad 500 is attached at the center of the front part 100a.

As mentioned above, the other basic structure of the head mounted display 10 according to the second embodiment is the same as that of the head mounted display 10 according to the first embodiment and thus not redundantly described.

As described above, in the structure of the head mounted display 10 according to the second embodiment, like the head mounted display 10 according to the first embodiment, even when the temples 100b flex outward and consequently the frame is deformed when an observer wears the frame on the head, the deformation of the frame does not cause displacement (change in position) of the light guides, or causes only slight displacement if any. It is thereby possible to reliably prevent a change in the angle of convergence of left and right images. This allows a user to view images comfortably. Further, because there is no need to enhance the stiffness of the front part 100a of the frame 100, it is possible to suppress the frame weight from increasing without an increase in costs and thereby provide the head mounted display 10 with high level of design.

Although preferred embodiments of the present invention are described in detail above with reference to the appended drawings, the present invention is not limited thereto. It should be understood by those skilled in the art that various modifications, combinations, sub-combinations and alterations may occur depending on design requirements and other factors insofar as they are within the scope of the appended claims or the equivalents thereof.

For example, the structure and configuration of the head mounted display described in each of the above embodiments are given by way of illustration and may be varied as appropriate. As an example, a surface relief type hologram (cf. United States Patent No. 20040062505A1) may be disposed on the light guide plate.

For the light guides 230L and 230R according to the second embodiment, the diffraction grating elements may be formed using transmission diffraction grating elements. Alternatively, either one of the first polarizer or the second polarizer may be formed using a reflection diffraction grating element, and the other one may be formed using a transmission diffraction grating element. Further, the diffraction grating element may be a reflection type blazed diffraction grating element.

As an alternative example of the first and second embodiments, an active matrix image formation unit may be used which includes a semiconductor light emitting element composed of light emitting panels arranged in two-dimensional matrix and which displays images by controlling the light emitting/non-emitting state of each of the semiconductor light emitting element so as to allow direct viewing of the light emission state of the semiconductor light emitting element. In this case also, light output from the image formation unit is input to the light guide plates through the collimator optical system.

The image formation unit may perform image formation for color display which controls the light emitting/non-emitting state of each of a red light emitting element, a green light emitting element, and a blue light emitting element. In this case also, light output from the image formation unit is input to the light guide plates through the collimator optical system.

The present application contains subject matter related to that disclosed in Japanese Priority Patent Application JP 2010-087785 filed in the Japan Patent Office on Apr. 6, 2010, the entire content of which is hereby incorporated by reference.

What is claimed is:

1. A head mounted display comprising: a glasses-type frame to be worn on a head of an observer;
   two optical modules including:
   two image creation devices, and two light guides having two light guide plates,
   coupled one-to-one with the two image creation devices and placed closer to a center of a face of the observer than the image creation devices are as a whole, to guide light beams output from the image creation devices and to output the light beams toward pupils of the observer; and
   an optical plate supporting the two light guides, wherein the optical plate is: attached to a center part of the frame;
   attached to a periphery part of each of the two light guides via an adhesive bond;
   located such that it covers the light beams propagating through the two light guide plates; and
   located on the opposite side of the two light guide plates as the head of the observer when the glasses-type frame is worn by the observer;
   wherein the center part of the frame is thicker than an outside part.

2. The head mounted display according to claim 1, wherein:
   the optical plate is attached to the center part of the frame using a frame attachment member.

3. The head mounted display according to claim 1, wherein:
   a center part of the optical plate is reinforced by a joint member including a reinforcing member and an adhesive bond.

4. The head mounted display according to claim 1, wherein: the optical plate is bonded to the two light guide plates by the adhesive bond containing a spacer.

5. The head mounted display according to claim 1, wherein:
   the optical plate is a flat transparent glass plate.

6. The head mounted display according to claim 1, wherein:
   the optical plate is coupled to respective rims of the two light guide plates using a rail.

7. The head mounted display according to claim 1, wherein:
   the two light guides guide light beams output from the two image creation devices by repeating total reflection in the two light guide plates, and
   the optical plate is bonded to total reflection planes of the two light guide plates.

8. The head mounted display according to claim 1, wherein:
   holographic optical elements are placed on an input side and on an output side of each of the two light guide plates respectively in the two light guides.

9. The head mounted display according to claim 1, wherein:
   the two light guide plates have a mirror internally on an input side and a half mirror film on an output side.

10. A head mounted display comprising: a glasses-type frame to be worn on a head of an observer; two optical modules including:
    two image creation devices, and two light guides having two light guide plates, coupled one-to-one with the two image creation devices and placed closer to a center of a face of the observer than the image creation devices are as a whole, to guide light beams output from the image creation devices and to output the light beams toward pupils of the observer; and
    an optical plate supporting the two light guides, wherein the optical plate is: attached to a center part of the frame;
    attached to a periphery part of each of the two light guides via an adhesive;
    located such that it covers output surfaces of the two light guide plates; and
    located on the opposite side of the two light guide plates as the head of the observer when the glasses-type frame is worn by the observer
    wherein the center part of the frame is thicker than an outside part.

11. The head mounted display according to claim 10, wherein:
    the optical plate is attached to the center part of the frame using a frame attachment member.

12. The head mounted display according to claim 10, wherein:
    a center part of the optical plate is reinforced by a joint member including a reinforcing member and an adhesive bond.

13. The head mounted display according to claim 10, wherein: the optical plate is bonded to the two light guide plates by the adhesive bond containing a spacer.

14. The head mounted display according to claim 10, wherein:
    the optical plate is a flat transparent glass plate.

15. The head mounted display according to claim 10, wherein:
    the optical plate is coupled to respective rims of the two light guide plates using a rail.

16. The head mounted display according to claim 10, wherein:
    the two light guides guide light beams output from the two image creation devices by repeating total reflection in the two light guide plates, and the optical plate is bonded to total reflection planes of the two light guide plates.

17. The head mounted display according to claim 10, wherein:
    holographic optical elements are respectively placed on an input side and on an output side of each of the two light guide plates in the two light guides.

18. The head mounted display according to claim 10, wherein:
    the two light guide plates have a mirror internally on an input side and a half minor film on an output side.

19. A head mounted display comprising: a glasses-type frame to be worn on a head of an observer;
    two optical modules including: two image creation devices, and two light guides having two light guide plates coupled one-to-one with the two image creation devices and placed closer to a center of a face of the observer than the image creation devices are as a whole, to guide light beams output from the image creation devices and to output the light beams toward pupils of the observer; and an optical plate supporting the two light guides, wherein the optical plate is: attached to a center part of the frame and is attached to a periphery part of each of the two light guides via an adhesive bond, wherein reflective elements are respectively located on an input side and on an output side of each of the two light guide plates in the two light guides, and wherein the optical plate is located such that it covers reflective elements on the output side of the two light guide plates; and located on the opposite side of the two light guide plates as the head of the observer when the glasses-type frame is worn by the observer;

wherein the center part of the frame is thicker than an outside part.

20. The head mounted display according to claim 19, wherein:

the optical plate is attached to the center part of the frame using a frame attachment member.

21. The head mounted display according to claim 19, wherein:

a center part of the optical plate is reinforced by a joint member including a reinforcing member and an adhesive bond.

22. The head mounted display according to claim 1, wherein: the optical plate is bonded to the two light guide plates by the adhesive bond containing a spacer.

23. The head mounted display according to claim 19, wherein:

the optical plate is a flat transparent glass plate.

24. The head mounted display according to claim 19, wherein:

the optical plate is coupled to respective rims of the two light guide plates using a rail.

25. The head mounted display according to claim 19, wherein the two light guides guide light beams output from the two image creation devices by repeating total reflection in the two light guide plates, and the optical plate is bonded to total reflection planes of the two light guide plates.

26. The head mounted display according to claim 19, wherein:

the reflective element is a holographic optical element.

27. The head mounted display according to claim 19, wherein:

the reflective element is a half mirror.

* * * * *